United States Patent [19]

Bogert et al.

[11] 4,228,531

[45] Oct. 14, 1980

[54] AUTOMATIC UNDERWATER NULL STEERING

[75] Inventors: Bruce P. Bogert, Morristown; Peter Hirsch, Parsippany, both of N.J.

[73] Assignee: The United States of America as represented by the Secretary of the Navy, Washington, D.C.

[21] Appl. No.: 57,841

[22] Filed: Sep. 17, 1970

[51] Int. Cl.³ .............................................. H04B 1/06
[52] U.S. Cl. ................................... 367/135; 367/901
[58] Field of Search ............ 340/6 R, 16 R; 367/135, 367/901, 119

[56] References Cited

U.S. PATENT DOCUMENTS

| 3,344,881 | 10/1967 | White | 340/6 R X |
| 3,464,056 | 8/1969 | Ziehm et al. | 340/6 R |

*Primary Examiner*—Richard A. Farley
*Attorney, Agent, or Firm*—R. S. Sciascia; R. W. Adams

[57] ABSTRACT

Means are provided for reducing the dynamic range requirement of an underwater sound system by minimizing the effects of noise interference. Computer means are provided to automatically rotate the pattern function of the combination of the dipole hydrophones in the system. A minimum noise pattern position is derived from hydrophone output information.

3 Claims, 4 Drawing Figures

AUTOMATIC UNDERWATER NULL STEERING

BACKGROUND OF THE INVENTION

The invention is in the field of underwater sound transmission systems. One example of such systems is an array of hydrophones arranged to receive underwater sound energy and which is directionally sensitive to the angle of arrival of an impinging sound wave. Such arrays are commonly employed in sonar systems.

In such systems of the prior art interfering noise at the hydrophones can cause clipping nonlinearities in the system, greatly degrading performance. It is known that the effect of such interference can be reduced by combining the outputs of dipole hydrophones positioned orthogonally with respect to each other in such manner that the resulting dipole pattern can be steered to achieve a null. The invention overcomes the deficiencies of the prior art by providing means for automatically computing a null position and rotating the pattern function of the combination of two dipole hydrophones to such position to minimize noise in the system.

SUMMARY OF THE INVENTION

The invention increases the dynamic range of an underwater sound transmission system by weighting the outputs of a pair of dipole hydrophones with a value designed to minimize noise interference in the transmission system input. A specialized analog computer processes the output signals from the hydrophones, which have mutually orthogonal sensitivity patterns, to derive the weighting values. The computer has two inputs from the hydrophones, $$\int_0^{2\pi} N(\phi) \cos^2 \phi \, d\phi \text{ and } \int_0^{2\pi} N(\phi) \sin^2 \phi \, d\phi,$$

$N(\phi)$ being a directionality factor involving the approach angle $\phi$ of an underwater soundwave.

The computer calculates two output values, $\sin \phi_o$ and $\cos \phi_o$ which are used to weight the hydrophone outputs. $\phi_o$ is an angle at which the sensitivity pattern of the combination of the hydrophones nulls to minimize noise in the transmission system input.

DESCRIPTION OF THE PREFERRED EMBODIMENT

Figure 1:
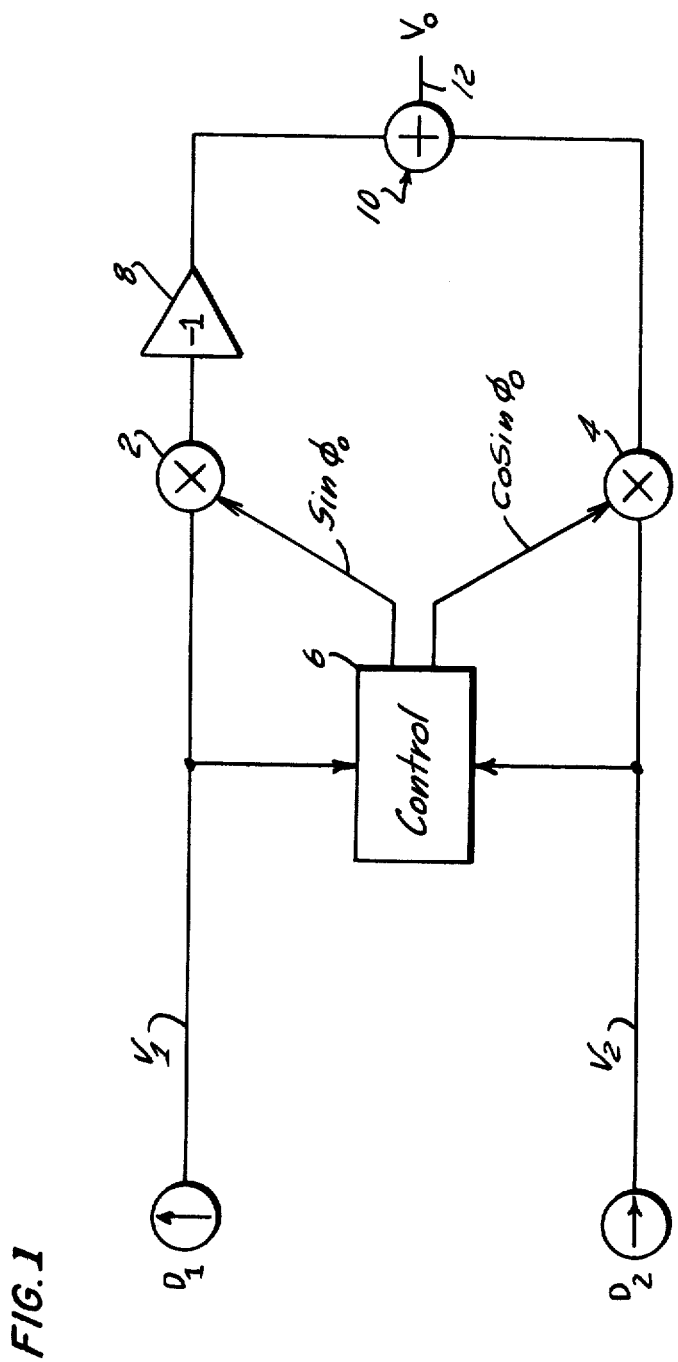
FIG. 1 shows an arrangement for minimizing the noise output of steered dipole hydrophones.

FIG. 1 shows an underwater sound transmission system having two dipole hydrophones $D_1$ and $D_2$ which are co-located and have mutually orthogonal sensitivity patterns. The arrangement is such that the expected output power $P_1$ of hydrophone $D_1$ is $$P_1 = \int_0^{2\pi} N(\phi) \cos^2 \phi \, d\phi \tag{1}$$

The expected output power $P_2$ of hydrophone $D_2$ is $$P_2 = \int_0^{2\pi} N(\phi) \sin^2 \phi \, d\phi \tag{2}$$

Here $\phi$ is the azimuthal variable, that is the azimuth of the noise sources which generate noise impinging on hydrophones $D_1$ and $D_2$. $N(\phi)$ is the noise directionality function.

The expected power output $P_o$ at an output terminal 12 is $$P_o = \int_0^{2\pi} N(\phi) \sin^2 (\phi - \phi_o) \, d\phi \tag{3}$$

where $\phi_o$ is the azimuthal angle of a hypothetical sound wave arriving at hydrophones $D_1$ and $D_2$ but producing no output power at terminal 12 because of the circuit. $P_o$ has nulls in the $\phi_o$ and the $(\phi_o + \pi)$ directions.

Nulls in the sensitivity pattern of $P_o$ are automatically steered to the position which minimizes noise power in the signal $V_o$. In effect, nulls are steered by adding weighted outputs of $D_1$ and $D_2$.

The output signal $V_1$ of hydrophone $D_1$ is multiplied by a factor $\sin \phi_o$ in a multiplier 2. The quantity $V_1 \sin \phi_o$ is inverted in an amplifier 8 and added to a quantity $V_2 \cos \phi_o$ in a summing circuit 10 which generates the output $V_o$ of the circuit of FIG. 1 on terminal 12. The value $V_2 \cos \phi_o$ is derived from hydrophone $D_2$ and a multiplier 4 which has a $\cos \phi_o$ input from an output of a control 6.

Control 6 is connected to receive the outputs of $D_1$ and $D_2$ and to generate the value $\sin \phi_o$ and $\cos \phi_o$ which are furnished to multipliers 2 and 4. To minimize noise in the output of the circuit of FIG. 1 it is necessary for control 6 to compute those values of $\cos \phi_o$ and $\sin \phi_o$ which will minimize $P_o$. It is necessary for control 6 to find the zero of $$\frac{\partial P_o}{\partial \phi_o} \text{ where}$$

$$\frac{\partial P_o}{\partial \phi_o} = \int_0^{2\pi} N(\phi) [\sin 2\phi \cos 2\phi_o - \sin 2\phi_o \cos 2\phi] \, d\phi \tag{4}$$

If $N(\phi)$ is expanded in a Fourier series on the interval $(0, 2\pi)$ only the second harmonic will contribute to the integral in equation (4) and without loss of generality, $N(\phi)$ can be written $$N(\phi) = Q + R \cos(2\phi + \phi_1) \tag{5}$$

where R is the maximum power level of the second harmonic component of $N(\phi)$.

Substituting equation (5) into equation (4), integrating and simplifying results in $$\sin(\phi_1 - 2\phi_o) = 0 \tag{6}$$

from which $$\cos \phi_o = \cos(\tfrac{1}{2} \phi_1) = \tag{7}$$

$$\sqrt{\tfrac{1}{2}(1-\cos\phi_1)} = \left[\tfrac{1}{2}(1-\tfrac{1}{R}\int N\cos 2\phi\, d\phi)\right]^{\tfrac{1}{2}}$$

and $$\sin\phi_o = \left[\tfrac{1}{2}(1-\tfrac{1}{R}\int N\cos 2\phi\, d\phi)\right]^{\tfrac{1}{2}} \quad (8)$$

Equations (7) and (8) are the values for sin $\phi_o$ and cos $\phi_o$ required to be generated by control 6 to minimize the noise at output terminal 12.

Figure 2:
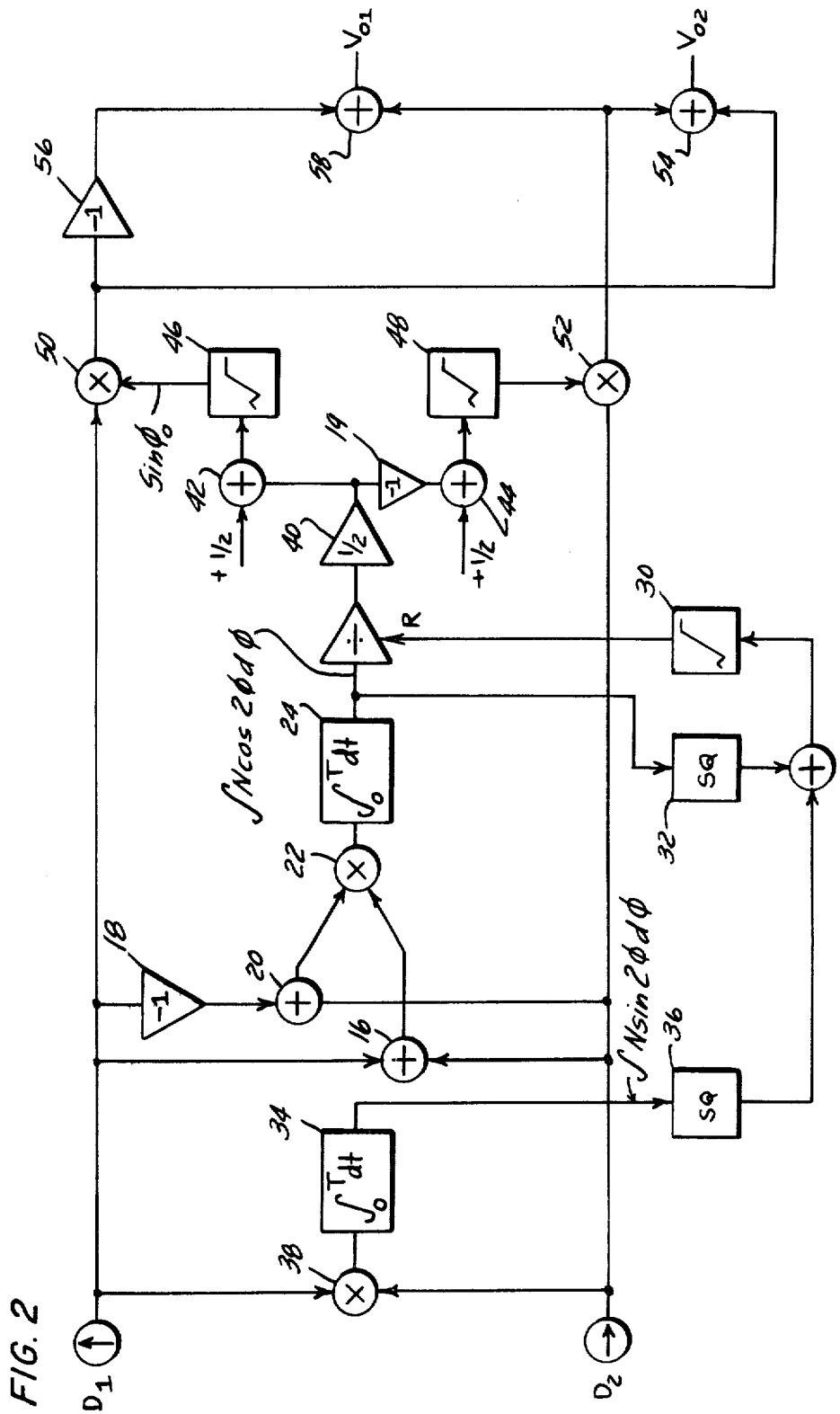
FIG. 2 shows details of an analog computer for computing the values $\sin \phi_o$ and $\cos \phi_o$ used in the apparatus of FIG. 1.

FIG. 2 illustrates the arrangement of the control 6 in FIG. 1. Control 6 is an analog computer which computes the values of sin $\phi_o$ and cos $\phi_o$ required to minimize noise at output terminal 12 of FIG. 1. In FIG. 2 dipole hydrophones $D_1$ and $D_2$ furnish output signals to a summing circuit 16. The output of $D_1$ is inverted in an inverter 18 which supplies an input to a summing circuit 20. The output of $D_2$ is furnished as a second input to 20. The sum outputs of 16 and 20 are multiplied in a multiplier 22 to obtain a product which is integrated in an integrating circuit 24 to obtain the quantity $\int N \cos 2\phi\, d\phi$ which is supplied to a dividing circuit 26. The output of 26 is controlled also by a value R which is obtained by passing the output of a summing circuit 28 through a square root extracting circuit 30. One input to summing circuit 28 is derived by squaring the output of integrator 24 in a squaring circuit 32. A second input to summing circuit 28 is derived by squaring the output of an integrating circuit 34 in a squaring circuit 36. The input to integrator 34 is the output of a multiplier 38 which has as inputs the outputs from $D_1$ and $D_2$.

The output of dividing circuit 26 is halved in a dividing circuit 40 and applied to a summing circuit 42 and through an inverter 19 to a summing circuit 44. A second input to each of circuits 42 and 44 furnishes the quantity $\tfrac{1}{2}$ to be summed with the output of 40. The outputs of 42 and 44 are furnished to two respective square root circuits 46 and 48 which furnish the output values sin $\phi_o$ and cos $\phi_o$ to two multiplying circuits 50 and 52. See equations (8) and (9). 50 and 52 receive the outputs of dipole hydrophones $D_1$ and $D_2$ respectively. The outputs of 50 and 52 are summed in an output summing circuit 54 to obtain a system output signal $V_{02}$. The output of 50 is inverted in an inverter 56 and summed with the output 52 in a second output summing circuit 58 to obtain a second system output signal $V_{01}$ which is 90° out of phase with $V_{02}$. Means not shown, for example a known comparator circuit, are provided to select the smaller of the two system outputs.

If only one interfering noise source $N_J(\phi)$ is expected, then a simpler apparatus than that of FIG. 2 may be used. The simplification follows from the approximation that, in the presence of $N_J(\phi)$, the total power is dominated by $N_J(\phi)$ so that $$P_o = \int N_J(\phi)\sin^2(\phi-\phi_o)d\phi \quad (9)$$

Since the interference is assumed to come from a single direction, say $\phi_1$, then $$N_J(\phi) = M\delta(\phi-\phi_1) \quad (10)$$

where M is the interference strength. These assumptions lead to the simplified expressions $$\sin^2\phi_o = \int N(\phi)\sin^2\phi\, d\phi / \int N(\phi)d\phi \quad (11)$$

and $$\cos^2\phi_o = \int N(\phi)\cos^2(\phi)d\phi / \int N(\phi)d(\phi) \quad (12)$$

Figures 3, 4:
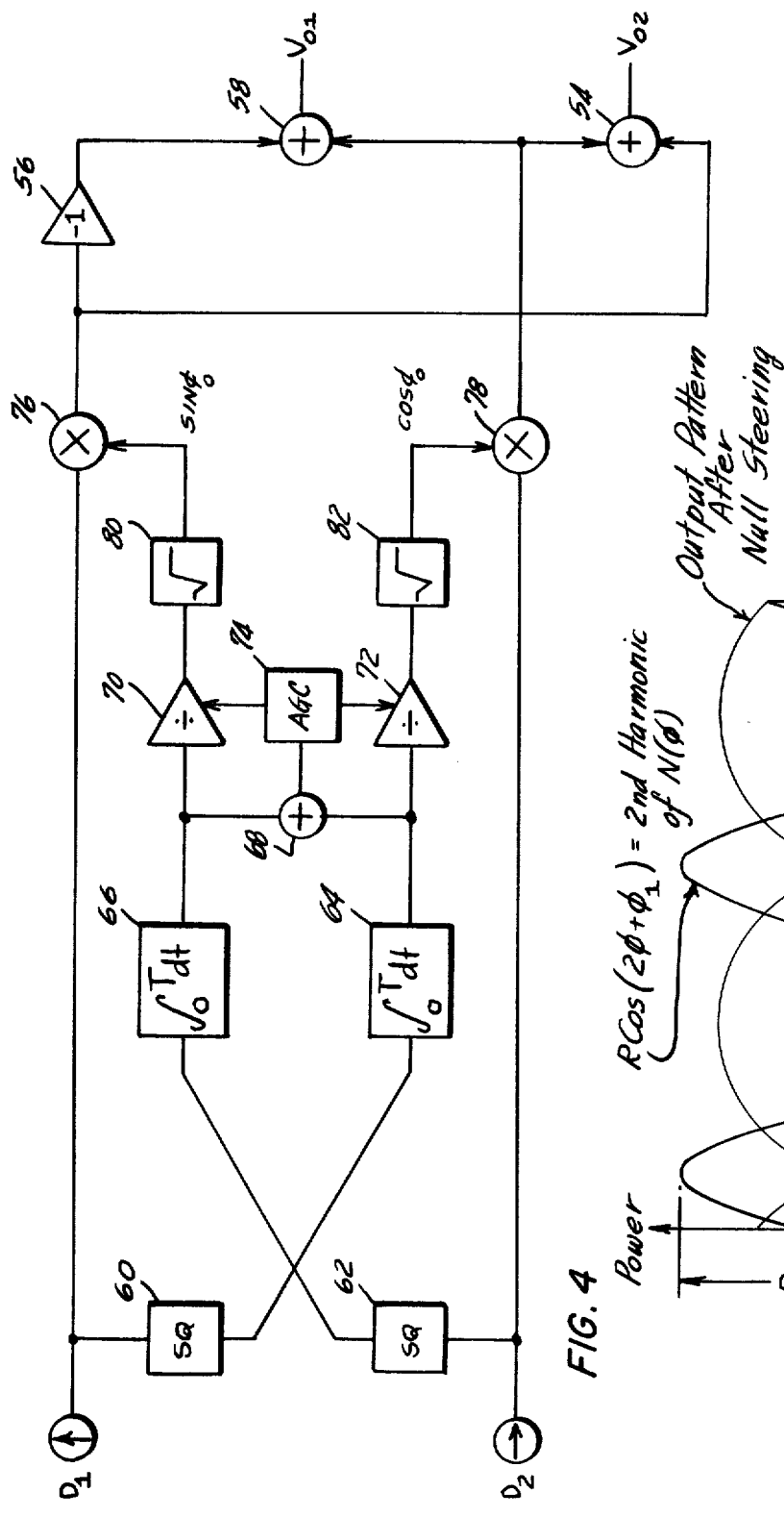
FIG. 3 shows a simplified computer useful in situations where only one noise source is encountered.
FIG. 4 is a graph illustrating the relationship between the output pattern after null steering and noise directionality as a function of azimuth.

These expressions are implemented by the simplified apparatus shown in FIG. 3, where the output signals from hydrophones $D_1$ and $D_2$ go to two squaring circuits 60 and 62. The outputs of 60 and 62 are integrated in two respective integrating circuits 64 and 66. The outputs of 64 and 66 go to a summing circuit 68 and to two dividing circuits 70 and 72. The output of summing circuit 68 controls an AGC circuit 74 which has two outputs connected to dividing circuits 70 and 72. The outputs of 70 and 72 are connected to two respective square root circuits 80 and 82 to obtain sin $\phi_o$ and cos $\phi_o$ outputs which are forwarded to two multipliers 76 and 78. As in the apparatus of FIG. 2 an inverter 56 and two summing circuits 54 and 58 are provided to obtain the system output.

FIG. 4 shows the relationship of the dipole sensitivity pattern after null steering to power and to the second harmonic of N ($\phi$). The terms "R, $\phi$, $\phi_o$, and $\phi_1$" are graphically illustrated. As shown in FIG. 4, R is equal to the maximum magnitude of the second harmonic of N ($\phi$) and $\phi_o$ is equal to $\tfrac{1}{2}$ of $\phi_1$.

What is claimed is:

1. In an underwater sound transmission system, the improvement comprising:

a pair of dipole hydrophones, said hydrophones being positioned so that their sensitivity patterns are orthogonal with respect to each other, each of said hydrophones being adapted to receive sound energy approaching at an angle $\phi$ to develop a hydrophone output signal V, said system developing an output signal $V_o$ in response to said hydrophone output signals V, computing means connected to receive said hydrophone output signals V, said computing means being adapted to derive functions of an angle $\phi_o$ from said signals V, a pair of multiplying means for multiplying each hydrophone output signal V by a respective function of $\phi_o$ to generate a pair of product signals $V_1 \sin\phi_o$ and $V_2 \cos\phi_o$, combining means connected to said multiplying means to combine said product signals into the system output signal $V_o$, the angle $\phi_o$ being such that interference noise in said output signal $V_o$ is automatically minimized, said combining means including inverting means for inverting a product signal V f ($\phi_o$), said combining means including summing means for summing said product signals V f ($\phi_o$), said summing means including, a first summing circuit for summing one of said product signals $V_2 \cos\phi_o$ and an inverted product signal $-V_1 \sin\phi_o$ to derive a first system output signal $V_{01}$, and a second summing circuit for summing two of said product signals $V_2 \cos\phi_o$ and $V_1 \sin\phi_2$ to produce a second system output signal $V_{02}$.

2. The apparatus of claim 1, said computing means including, means for squaring said hydrophone output signals V, means for integrating the squares of output signals V, and means for combining the integrals of the squared output signals V to obtain signals sin $\phi_o$ and cos $\phi_o$.

3. The apparatus of claim 1, said computing means including,
- a first multiplying means 38 for multiplying the output signals $V_1$ and $V_2$ of a pair of said hydrophones $D_1$ and $D_2$,
- a first integrating means 34 for integrating the output of said multiplying means,
- a first squaring means 36 for squaring the output of said first integrating means,
- a first summing means 16 for summing the outputs $V_1$ and $V_2$ of said hydrophones $D_1$ and $D_2$,
- a first inverting means 18 for inverting a first of said hydrophone output signals $V_1$,
- a second summing means 20 for summing the inverted first hydrophone output signal $-V_1$ and the second hydrophone output signal $V_2$,
- a second multiplying circuit 22 for multiplying output signals from said first and second summing circuits,
- a second integrating circuit 24 for integrating an output signal from said second multiplying circuit 22,
- a second squaring circuit 32 for squaring an output signal from said second integrating circuit 24,
- a third summing circuit 28 for summing output signals from said first and said second squaring circuits 36 and 32,
- a first square root circuit 30 for deriving the square root of an output signal from said third summing circuit 28,
- a dividing circuit 26 for combining the outputs of said second integrating circuit 24 and said first square root circuit 30,
- a dividing circuit 40 for halving the output of said dividing circuit 26,
- a fourth summing circuit 42 for adding one-half of the output of said dividing means 40,
- a second square root circuit 48 of deriving the square root of the output of said fourth summing circuit 46 to generate a value sin $\phi_o$,
- a fifth summing circuit 44 for adding one-half to the output of said dividing means,
- and a third square root circuit 48 for deriving the square root of the output of said fifth summing circuit 44 to generate a value cos $\phi_o$.

* * * * *